United States Patent
Tanaka et al.

(10) Patent No.: US 9,048,753 B2
(45) Date of Patent: Jun. 2, 2015

(54) PFC CONVERTER INCLUDING TRANSFORMER

(75) Inventors: Hideki Tanaka, Nagaokakyo (JP); Kyoichi Takemura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/477,363

(22) Filed: May 22, 2012

(65) Prior Publication Data

US 2012/0230060 A1 Sep. 13, 2012

Related U.S. Application Data

(63) Continuation of application No. PCT/JP2010/066296, filed on Sep. 21, 2010.

(30) Foreign Application Priority Data

Dec. 4, 2009 (JP) .................................. 2009-276173

(51) Int. Cl.
*H02M 3/335* (2006.01)
*H02M 1/42* (2007.01)

(52) U.S. Cl.
CPC ............ *H02M 1/4258* (2013.01); *Y02B 70/126* (2013.01)

(58) Field of Classification Search
CPC ............ H02M 3/33569; H02M 3/338; H02M 3/3385; H02M 3/33507; H02M 3/335
USPC ........ 363/16, 18, 19, 20, 21.01, 21.02, 21.04, 363/21.08, 21.12, 21.16, 80, 95, 97, 131
See application file for complete search history.

(56) References Cited

U.S. PATENT DOCUMENTS

| | | | | |
|---|---|---|---|---|
| 6,052,290 A | * | 4/2000 | Moreau | ............................ 363/20 |
| 6,166,924 A | * | 12/2000 | Assow | .............................. 363/20 |
| 7,221,128 B2 | * | 5/2007 | Usui et al. | ...................... 323/207 |
| 2005/0201123 A1 | | 9/2005 | Usui et al. | |

(Continued)

FOREIGN PATENT DOCUMENTS

| | | |
|---|---|---|
| CN | 1205807 A | 1/1999 |
| CN | 1913319 A | 2/2007 |

(Continued)

OTHER PUBLICATIONS

Official Communication issued in International Patent Application No. PCT/JP2010/066296, mailed on Dec. 28, 2010.

(Continued)

*Primary Examiner* — Adolf Berhane
*Assistant Examiner* — Alex Torres-Rivera
(74) *Attorney, Agent, or Firm* — Keating & Bennett, LLP

(57) ABSTRACT

A PFC converter that reduces a superimposed voltage generated by an inrush current into a filter capacitor operates such that, when a commercial alternating-current power supply is connected to input terminals of a PFC converter, a rectified voltage is applied to a filter capacitor via a diode bridge and a charging current flows through the filter capacitor. At the same time, the rectified voltage is also applied to a series circuit including a diode and a capacitor and a charging current for the capacitor flows through the series circuit. Accordingly, a charging time constant becomes large and a superimposed voltage generated by the inductance component of a line or a line filter connected to the line and the charging current becomes low.

7 Claims, 9 Drawing Sheets

(56) References Cited

U.S. PATENT DOCUMENTS

| | | | |
|---|---|---|---|
| 2006/0214603 A1 | 9/2006 | Oh et al. | |
| 2007/0035971 A1* | 2/2007 | Yasumura | 363/21.02 |
| 2008/0094864 A1 | 4/2008 | Sekimoto et al. | |
| 2008/0211449 A1 | 9/2008 | Yamai et al. | |
| 2011/0216558 A1* | 9/2011 | Uno | 363/21.12 |
| 2011/0292693 A1* | 12/2011 | Niijima et al. | 363/21.17 |

FOREIGN PATENT DOCUMENTS

| | | |
|---|---|---|
| CN | 101010865 A | 8/2007 |
| CN | 101073197 A | 11/2007 |
| JP | 6-39270 U | 5/1994 |
| JP | 6-311737 A | 11/1994 |
| JP | 8-80055 A | 3/1996 |
| JP | 2006-166656 A | 6/2006 |
| JP | 2008-161031 A | 7/2008 |
| JP | 2008-537459 A | 9/2008 |

OTHER PUBLICATIONS

Official Communication issued in corresponding Chinese Patent Application No. 201080054331.3, mailed on Apr. 1, 2014.

* cited by examiner

FIG. 1  Prior Art
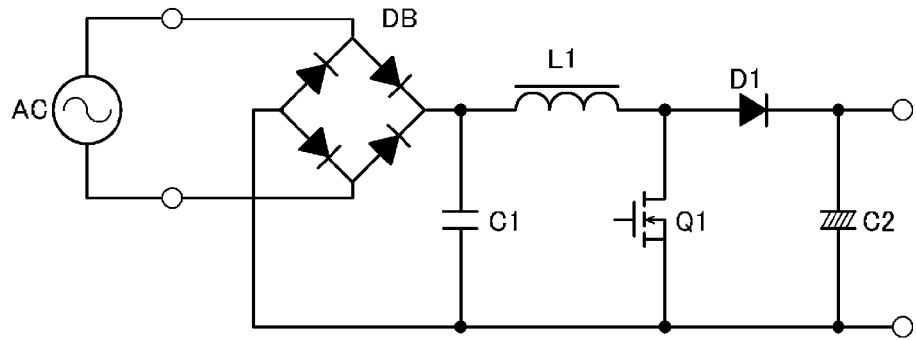
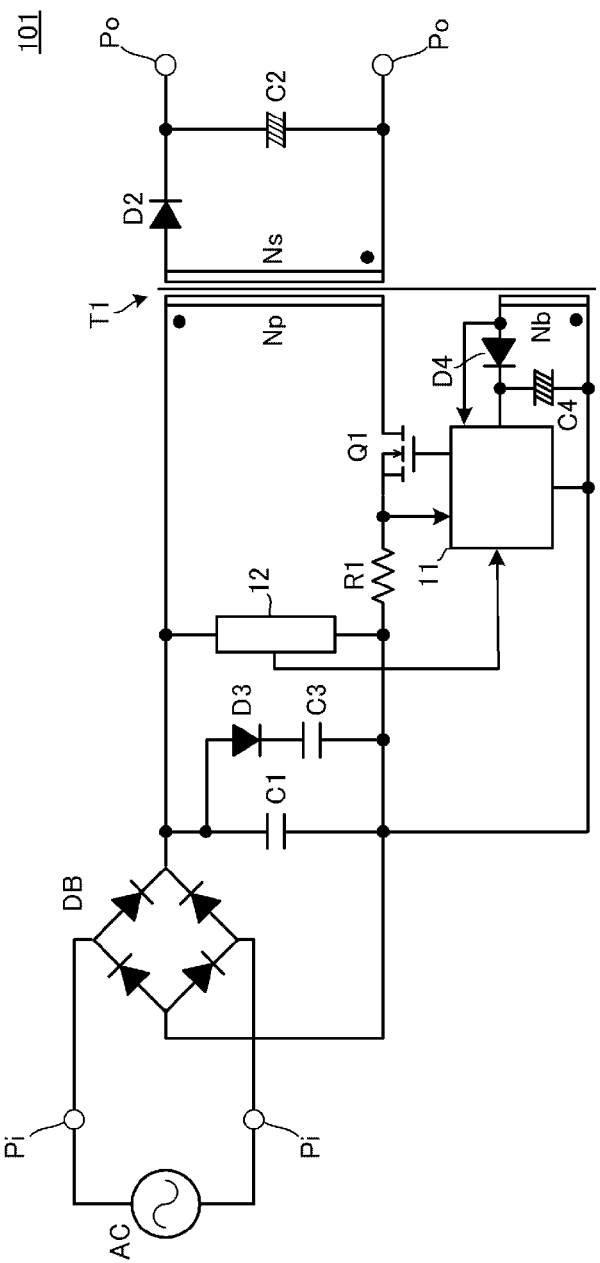
FIG. 2

PFC CONVERTER INCLUDING TRANSFORMER

BACKGROUND OF THE INVENTION

1. Field of the Invention

The present invention relates to PFC converters, and, more particularly, to a PFC converter including a transformer.

2. Description of the Related Art

In a switching power supply device that uses a commercial alternating-current power supply as an input power supply, supplies a steady voltage or a steady current to a load, and performs power conversion while maintaining a high power factor, a PFC converter is disposed at an input stage (see, for example, Japanese Unexamined Patent Application Publication No. 2008-537459).

FIG. 1 is a circuit diagram of a typical PFC converter in the related art. This PFC converter includes a step-up chopper circuit and a diode bridge for rectifying the voltage of a commercial alternating-current power supply AC. The step-up chopper circuit includes a capacitor C1, a choke coil L1, a switching element Q1, a diode D1, and a capacitor C2. In order to input a sinusoidal current having the same phase as an input voltage into a diode bridge DB, a switching control circuit is connected to the switching element Q1.

The step-up chopper circuit illustrated in FIG. 1 is a typical PFC converter in the related art, and is configured to output a predetermined direct-current voltage to a load with a DC-DC converter connected to the output terminal of the PFC converter. That is, the PFC converter and the DC-DC converter form a single power supply circuit.

However, in order to reduce the number of components and achieve the reduction in size and cost, the DC-DC converter sometimes also functions as a PFC converter. In this case, in order to isolate the load connected to the output terminal of the converter from the commercial power supply and step down an output voltage, an isolated transformer is used. A PFC converter including a transformer is disclosed in, for example, Japanese Unexamined Patent Application Publication No. 2008-161031.

However, in a case where a PFC converter including a transformer is used, the following problems arise. In a PFC converter including a transformer, the choke coil L1 illustrated in FIG. 1 is changed to the primary winding of a transformer, and the rectifier diode D1 and the smoothing capacitor C2 are connected to the secondary side of the transformer.

When a commercial alternating-current power supply is connected to such a circuit, an inrush current input into the capacitor C1 instantaneously becomes very large.

On the primary side of the transformer, a large-capacitance smoothing capacitor such as an electrolytic capacitor is not present and only the capacitor C1 that is a small-capacitance filter capacitor is present. Accordingly, at the time of connection to a commercial alternating-current power supply, an inrush current flows through the filter capacitor C1 and a superimposed voltage (L·di/dt) is generated by the inductance component of a line or a line filter (not illustrated) connected to the line and the inrush current.

Since the capacitance of the capacitor C1 is small, dt becomes very small and the superimposed voltage becomes very high.

Accordingly, in a PFC converter including a transformer, a filter capacitor and a switching element need to be high-withstand-voltage components and a superimposed voltage protection circuit is additionally needed. It is therefore difficult to reduce costs.

SUMMARY OF THE INVENTION

Preferred embodiments of the present invention provide a PFC converter that significantly reduces a superimposed voltage generated by an inrush current and solves the above-described problems.

A PFC converter according to a preferred embodiment of the present invention includes a rectifying circuit to rectify an alternating voltage input from an alternating-current input power supply, a first series circuit that includes a primary winding of a transformer and a switching element and is connected to an output portion of the rectifying circuit, a filter capacitor connected to the output portion of the rectifying circuit, a rectifying and smoothing circuit that is connected to a secondary winding of the transformer and includes a rectifier diode and a smoothing capacitor, and a second series circuit that includes a second switching element and a second capacitor connected in series to each other and is connected in parallel to the filter capacitor. The second switching element conducts in a forward direction when receiving a charging voltage for the filter capacitor.

The second switching element preferably is, for example, a diode that conducts in the forward direction when receiving a charging voltage for the filter capacitor.

The second switching element preferably is, for example, a transistor that is turned on when receiving the alternating voltage from the alternating-current input power supply.

In the second series circuit, a resistor may be connected in series to the second capacitor and the second switching element.

A discharging circuit configured to discharge an electrical charge stored in the second capacitor may be connected in parallel to the second capacitor.

A discharging circuit to discharge an electrical charge stored in the second capacitor may be connected in parallel to the second switching element or a third series circuit including the second switching element and the primary winding of the transformer connected in series to each other.

The primary winding and the secondary winding of the transformer are isolated from each other.

According to a preferred embodiment of the present invention, a superimposed voltage generated by an inrush current that flows through a line at the time of connection to an input power supply is reduced. Accordingly, a capacitor and a switching element do not have to have a high rated working voltage. This leads to cost reduction.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a circuit diagram of a typical PFC converter in the related art.

FIG. 2 is a circuit diagram of a PFC converter 101 according to a first preferred embodiment of the present invention.

DETAILED DESCRIPTION OF THE PREFERRED EMBODIMENTS

First Preferred Embodiment

Figure 3:
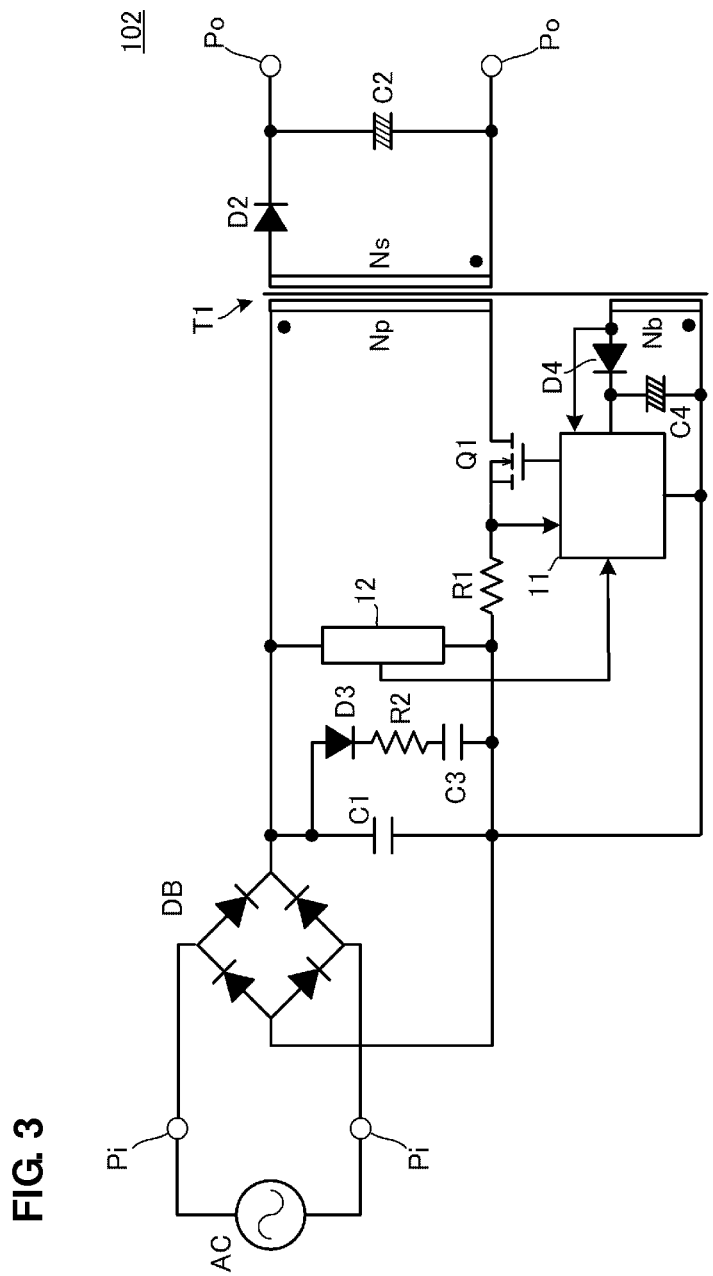
FIG. 3 is a circuit diagram of a PFC converter 102 according to a second preferred embodiment of the present invention.

FIG. 2 is a circuit diagram of a PFC converter 101 according to the first preferred embodiment of the present invention.

In the PFC converter 101, a commercial alternating-current power supply preferably is connected to input terminals Pi and a load is connected to output terminals Po. This load is, for example, an LED included in an LED illumination apparatus.

A diode bridge DB that is a rectifying circuit is connected to the input terminals Pi. A first series circuit including a primary winding Np of a transformer T1 and a switching element Q1 is connected to an output portion of the diode bridge DB. A filter capacitor C1 is connected to the output portion of the diode bridge DB. A rectifying and smoothing circuit including a rectifier diode D2 and a smoothing capacitor C2 is connected to a secondary winding Ns of the transformer T1.

A second series circuit including a diode D3 and a second capacitor C3 connected in series to each other is connected in parallel to the filter capacitor. The diode D3 is connected to the filter capacitor C1 so that it conducts in a forward direction when receiving a charging voltage for the filter capacitor C1.

A rectifying and smoothing circuit including a diode D4 and a capacitor C4 is connected to a control winding Nb of the transformer T1. A voltage output from this rectifying and smoothing circuit is applied to a switching control circuit 11 as a supply voltage.

The switching control circuit 11 outputs an ON/OFF control signal to the switching element Q1. The switching control circuit 11 receives an output voltage of an input voltage detection circuit 12, an output voltage of a current detection resistor R1, and an output voltage (power inversion timing signal) of the control winding Nb, and performs ON/OFF control on the switching element Q1 on the basis of these output voltages. As a result, the PFC converter operates. A method of operating a PFC converter on the basis of such signals is known.

When a commercial alternating-current power supply is connected to the input terminals Pi of the PFC converter 101 illustrated in FIG. 2, a rectified voltage is applied to the filter capacitor C1 via the diode bridge DB and a charging current flows through the filter capacitor C1. At the same time, the rectified voltage is also applied to the series circuit including the diode D3 and the capacitor C3 and a charging current for the capacitor C3 flows through the series circuit.

Since the capacitor C3 is connected in parallel to the filter capacitor, a charging time constant becomes large and a period in which the charging current flows becomes long. That is, "dt" in $L \cdot di/dt$ representing a superimposed voltage generated by the inductance component of a line or a line filter (not illustrated) connected to the line and the charging current becomes large. As a result, the superimposed voltage ($L \cdot di/dt$) becomes low.

It is desired that the capacitance of the capacitor C3 be several times larger than that of the filter capacitor C1. The larger the capacitance of the capacitor C3, the larger the charging time constant. Accordingly, the effect of reducing a superimposed voltage is improved.

In a period in which the switching element Q1 is in the ON sate, an electrical charge stored in the filter capacitor C1 is discharged in a path of the filter capacitor C1→the primary winding Np of the transformer T1→the switching element Q1→the resistor R1→the filter capacitor C1. On the other hand, since the diode D3 is connected in series to the capacitor C3, no discharging current flows via the diode D3. Accordingly, the increase in the capacitance of the capacitor C3 does not affect the operation of the PFC circuit, and the reduction in a power factor does not occur.

Second Preferred Embodiment

FIG. 3 is a circuit diagram of a PFC converter 102 according to a second preferred embodiment of the present invention.

The difference between the PFC converter 102 and the PFC converter 101 according to the first preferred embodiment illustrated in FIG. 2 is that the second series circuit connected in parallel to the filter capacitor C1 includes the diode D3, the second capacitor C3, and a resistor R2 connected in series to one another.

Since the resistor R2 is connected in series to the charging path for the capacitor C3, the peak of a charging current applied to the capacitor C3 can be limited even when the capacitance of the capacitor C3 is increased. Accordingly, elements such as the diode bridge DB and the diode D3 on the charging current path do not need to have a high rated current. This leads to cost reduction.

Third Preferred Embodiment

Figure 4:
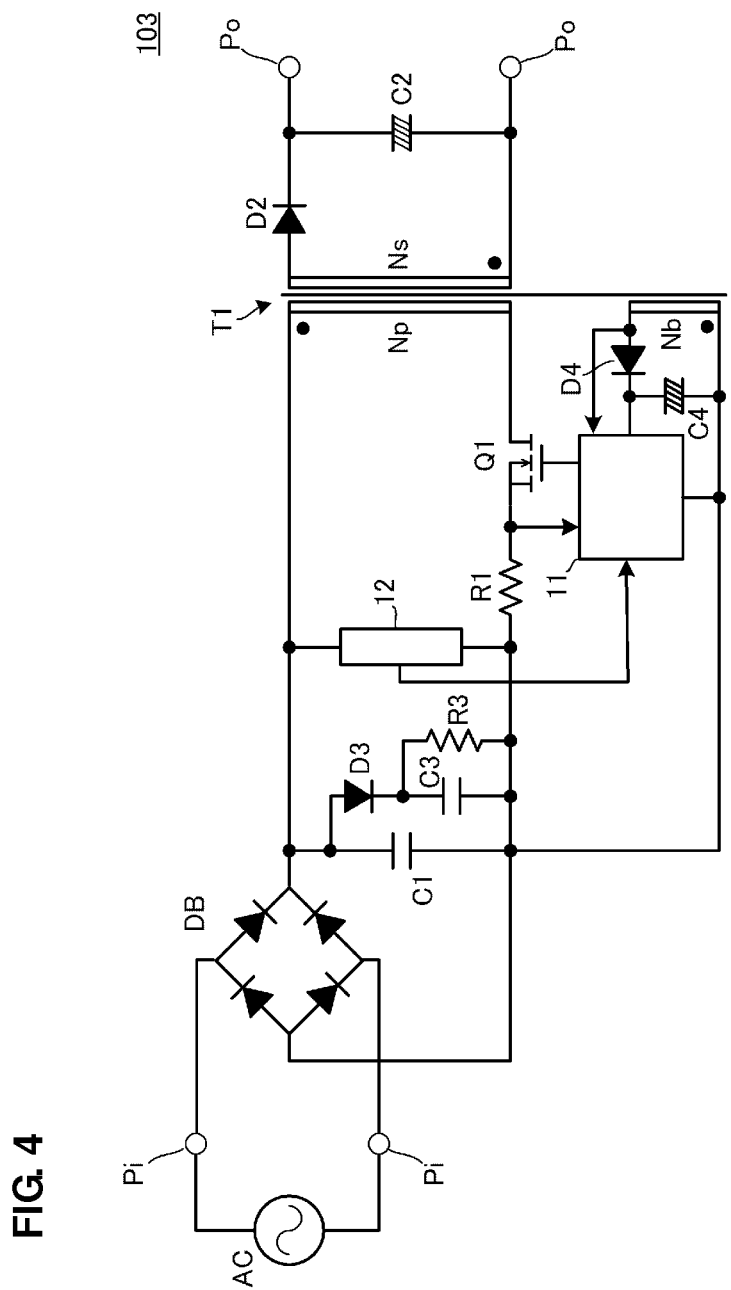
FIG. 4 is a circuit diagram of a PFC converter 103 according to a third preferred embodiment of the present invention.

FIG. 4 is a circuit diagram of a PFC converter 103 according to a third preferred embodiment of the present invention.

The difference between the PFC converter 103 and the PFC converter 101 according to the first preferred embodiment illustrated in FIG. 2 is that a resistor R3 is connected in parallel to the capacitor C3.

The resistor R3 aggressively forms a discharging path of an electrical charge stored in the capacitor C3. An electrical charge stored in the capacitor C3 at the time of connection to the commercial alternating-current power supply AC is rapidly discharged at the time of disconnection from the commercial alternating-current power supply AC. Accordingly, even when the commercial alternating-current power supply AC is intermittently connected and disconnected to and from the input terminals Pi of the PFC converter 103 in a short period, a predetermined charging current flows through the capacitor C3. The effect of reducing a superimposed current is therefore obtained.

Fourth Preferred Embodiment

Figure 5:
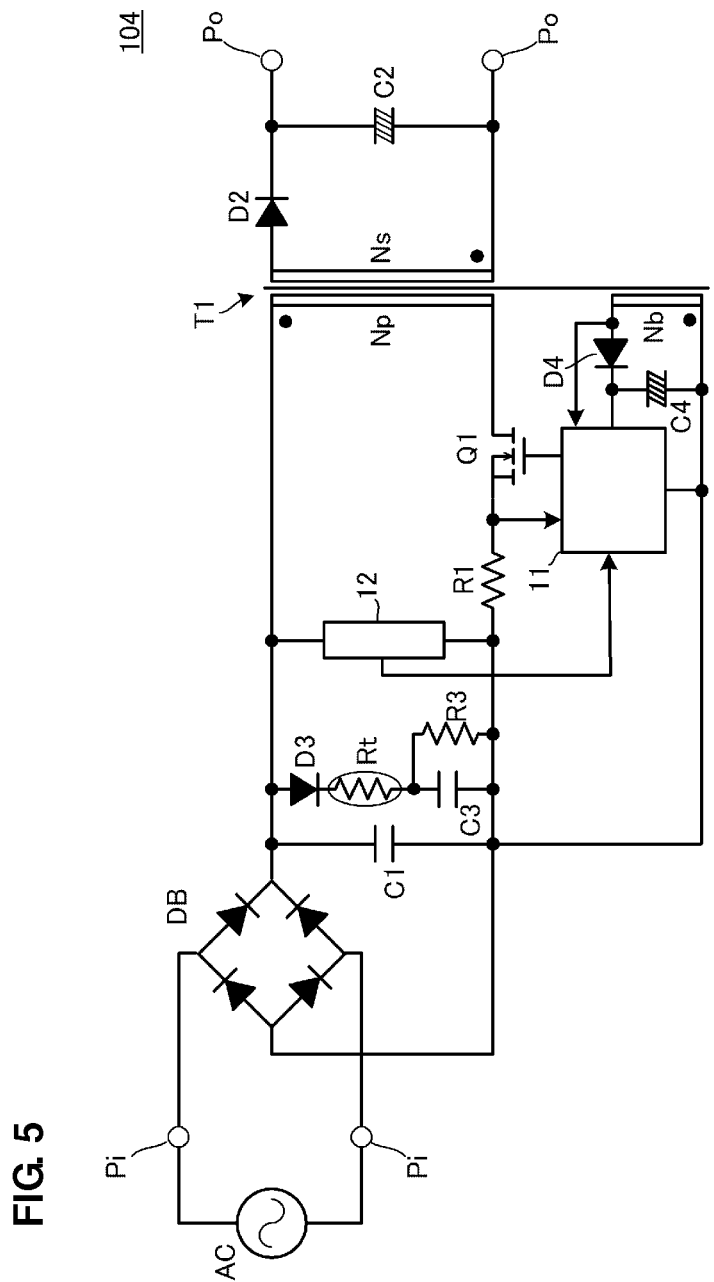
FIG. 5 is a circuit diagram of a PFC converter 104 according to a fourth preferred embodiment of the present invention.

FIG. 5 is a circuit diagram of a PFC converter 104 according to a fourth preferred embodiment of the present invention.

The difference between the PFC converter 104 and the PFC converter 102 according to the second preferred embodiment illustrated in FIG. 3 is that the second series circuit connected in parallel to the filter capacitor C1 includes the diode D3, the second capacitor C3, and a negative temperature coefficient thermistor Rt connected in series to one another and the resistor R3 is connected in parallel to the capacitor C3.

Since the negative temperature coefficient thermistor Rt is connected in series to the capacitor C3, an inrush charging current into the capacitor C3 at low temperatures at the time of power-up can be more effectively reduced.

Fifth Preferred Embodiment

Figure 6:
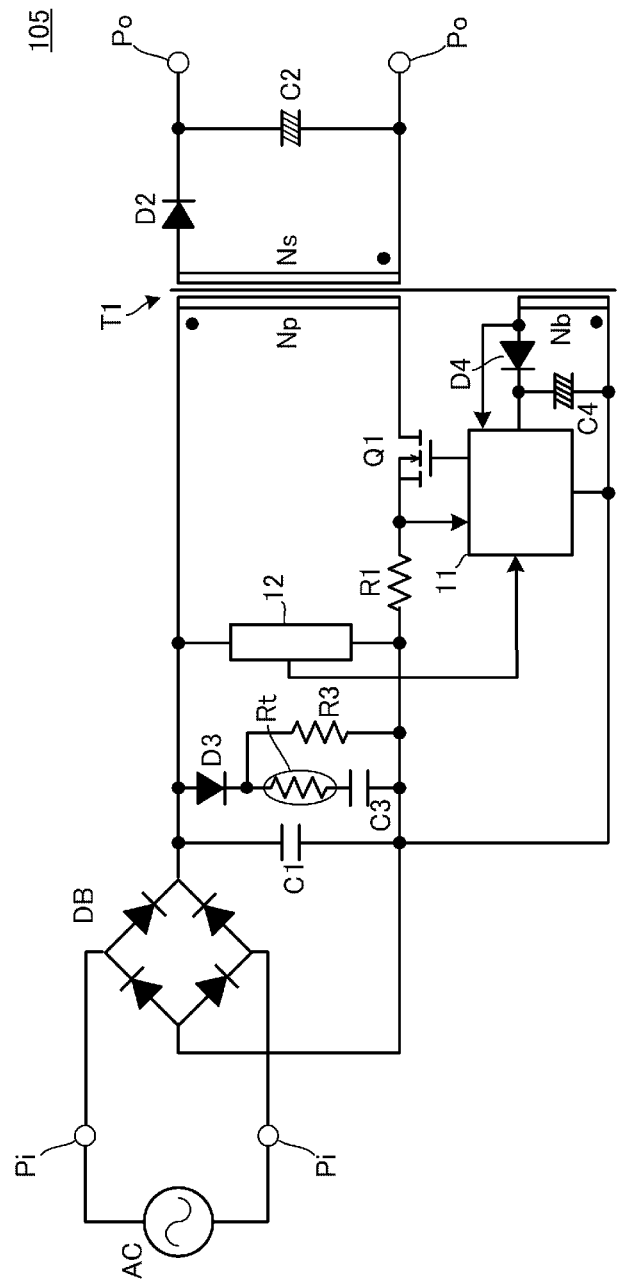
FIG. 6 is a circuit diagram of a PFC converter 105 according to a fifth preferred embodiment of the present invention.

FIG. 6 is a circuit diagram of a PFC converter 105 according to a fifth preferred embodiment of the present invention.

The difference between the PFC converter 105 and the PFC converter 104 according to the fourth preferred embodiment illustrated in FIG. 5 is that the resistor R3 is connected in parallel to a series circuit including the capacitor C3 and the thermistor Rt.

In this structure, since an electrical charge charging path and an electrical charge discharging path for the capacitor C3 includes the thermistor Rt, a charging current and a discharging current can be effectively reduced.

Sixth Preferred Embodiment

Figure 7:
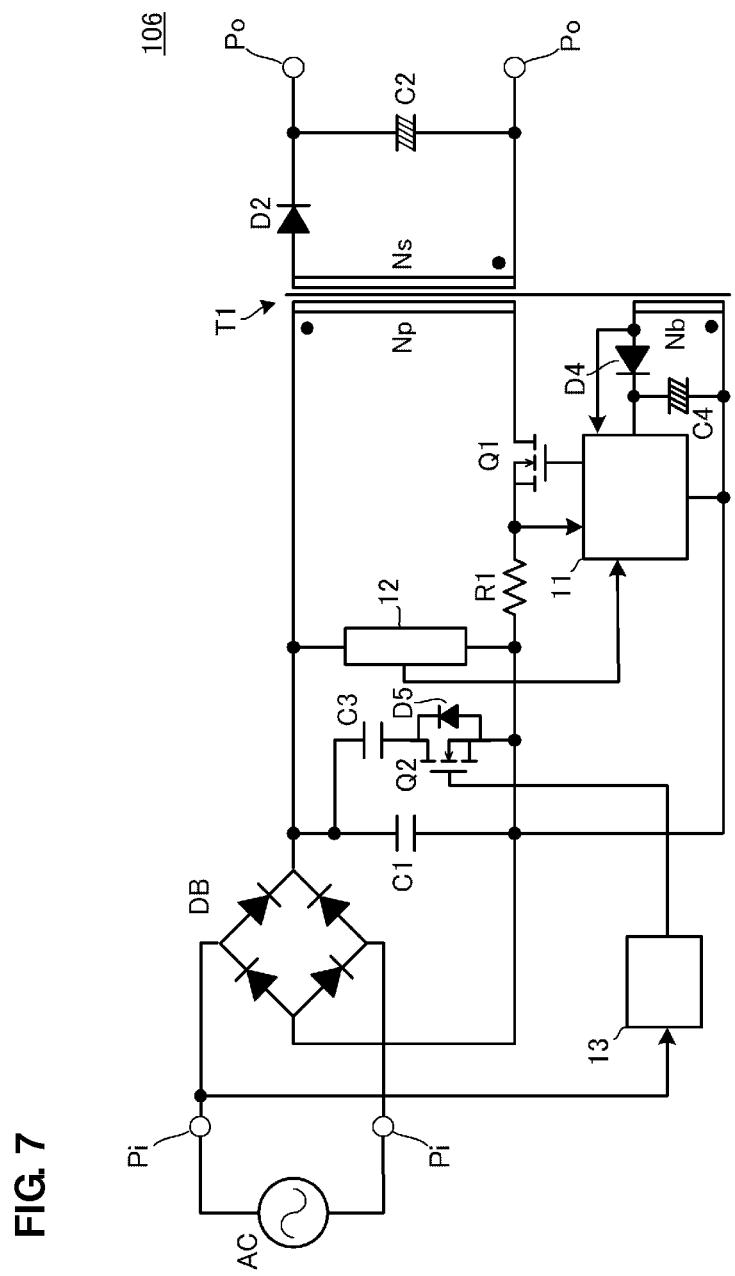
FIG. 7 is a circuit diagram of a PFC converter 106 according to a sixth preferred embodiment of the present invention.

FIG. 7 is a circuit diagram of a PFC converter 106 according to a sixth preferred embodiment of the present invention.

The difference between the PFC converter 106 and the PFC converter 101 according to the first preferred embodiment illustrated in FIG. 2 is that the second series circuit connected in parallel to the filter capacitor C1 includes the second capacitor C3 and a switching element Q2. The switching element Q2 is a MOSFET, and includes a parasitic diode D5 between the drain and source thereof.

The switching element Q2 is turned on or off under the control of a switching element control circuit 13. More specifically, the switching element control circuit 13 turns on the switching element Q2 when detecting the connection to the commercial alternating-current power supply AC and turns off the switching element Q2 before the switching control circuit 11 is operated. That is, only at the time of connection to the commercial alternating-current power supply AC, the second capacitor C3 is connected in parallel to the filter capacitor C1.

Before activation of the switching element control circuit 13, a supply voltage other than a voltage output from a rectifying and smoothing circuit is supplied to the switching element control circuit 13. Accordingly, the switching element control circuit 13 can operate and turn on the switching element Q2 before the switching of the switching element Q1 is performed.

Since the parasitic diode D5 included in the switching element Q2 forms an electrical charge discharging path for the capacitor C3, an electrical charge stored in the capacitor C3 is discharged after the switching element Q2 has been turned off. It is therefore possible to respond to the next connection to the commercial alternating-current power supply AC.

In the above-described example, a MOSFET switching element is preferably used. However, a bipolar transistor and a diode may also be used, for example.

Seventh Preferred Embodiment

Figure 8:
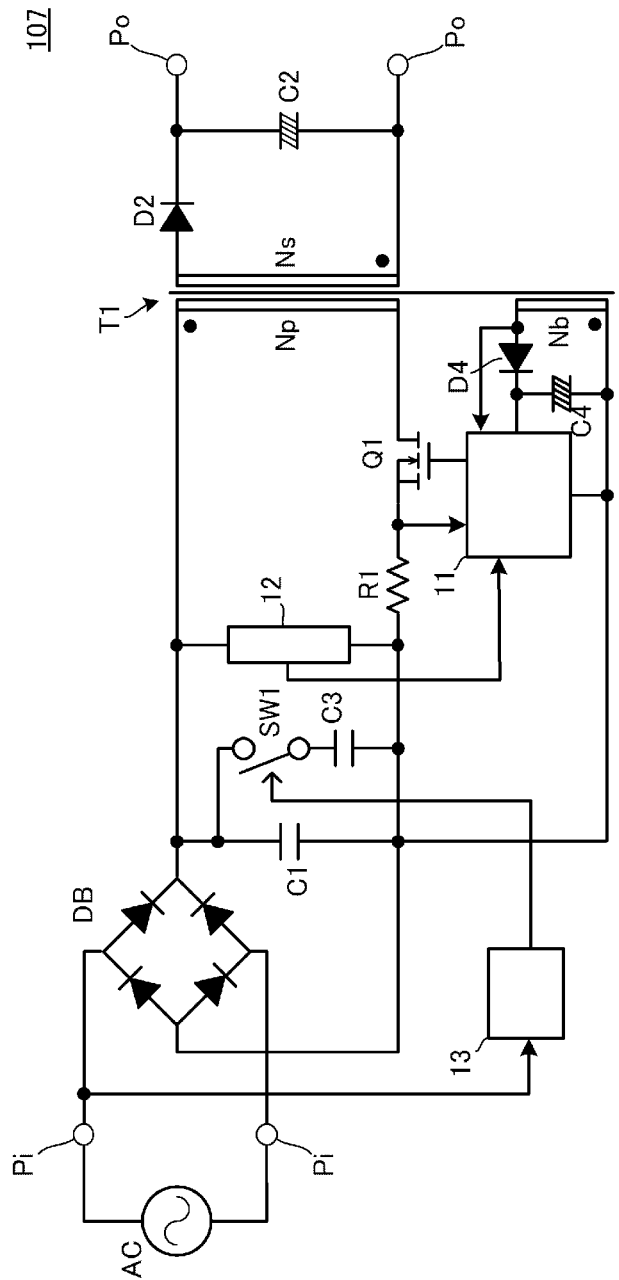
FIG. 8 is a circuit diagram of a PFC converter 107 according to a seventh preferred embodiment of the present invention.

FIG. 8 is a circuit diagram of a PFC converter 107 according to a seventh preferred embodiment of the present invention.

The difference between the PFC converter 107 and the PFC converter 106 according to the sixth preferred embodiment illustrated in FIG. 7 is that the second series circuit connected in parallel to the filter capacitor C1 includes the second capacitor C3 and a switching element SW1. The switching element SW1 is, for example, a relay switch.

Thus, a switch that is not a semiconductor switch can be used.

Eighth Preferred Embodiment

Figure 9:
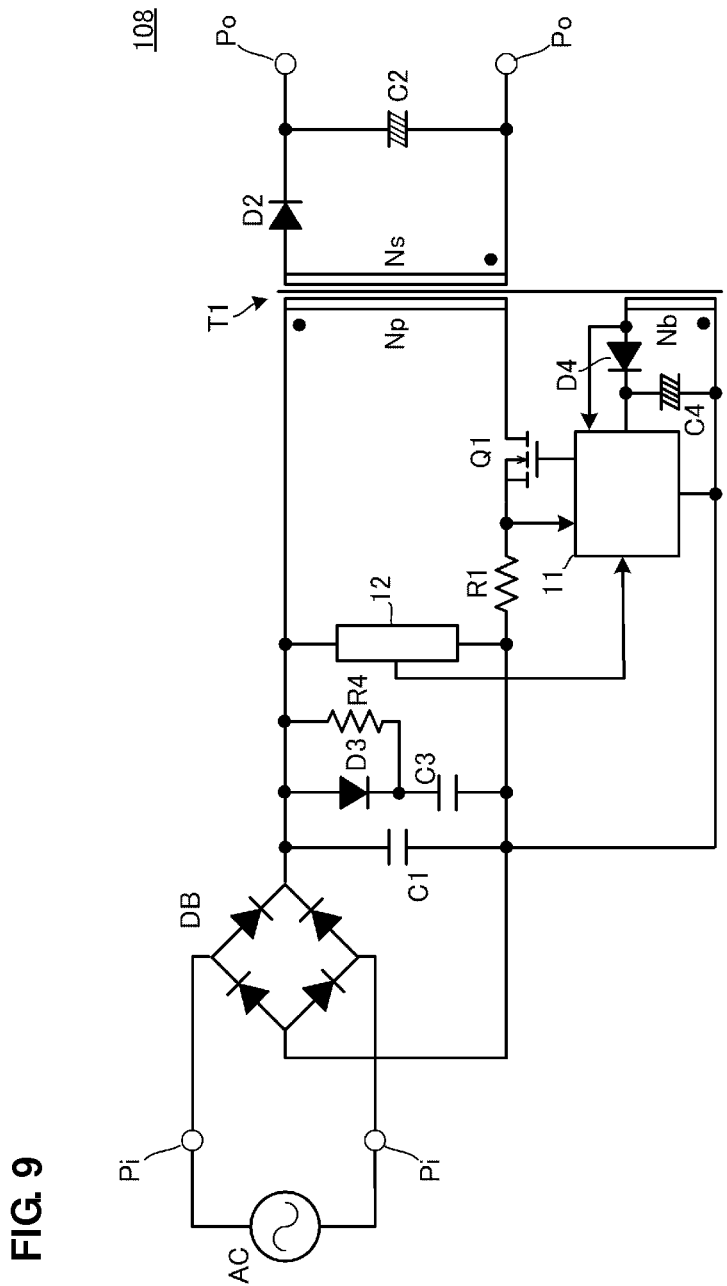
FIG. 9 is a circuit diagram of a PFC converter 108 according to an eighth preferred embodiment of the present invention.

FIG. 9 is a circuit diagram of a PFC converter 108 according to an eighth preferred embodiment of the present invention.

The difference between the PFC converter 108 and the PFC converter 103 according to the third preferred embodiment illustrated in FIG. 4 is that a resistor R4 is connected in parallel to the diode D3.

The resistor R4 forms an electrical charge discharging path for the capacitor C3. This discharging is not performed around the peak of a rectified voltage output from the diode bridge DB, and is performed at the other values of the rectified voltage. Accordingly, an electrical charge stored in the capacitor C3 at the time of connection to the commercial alternating-current power supply AC can be more effectively prevented from being lost because of discharging.

Ninth Preferred Embodiment

Figure 10:
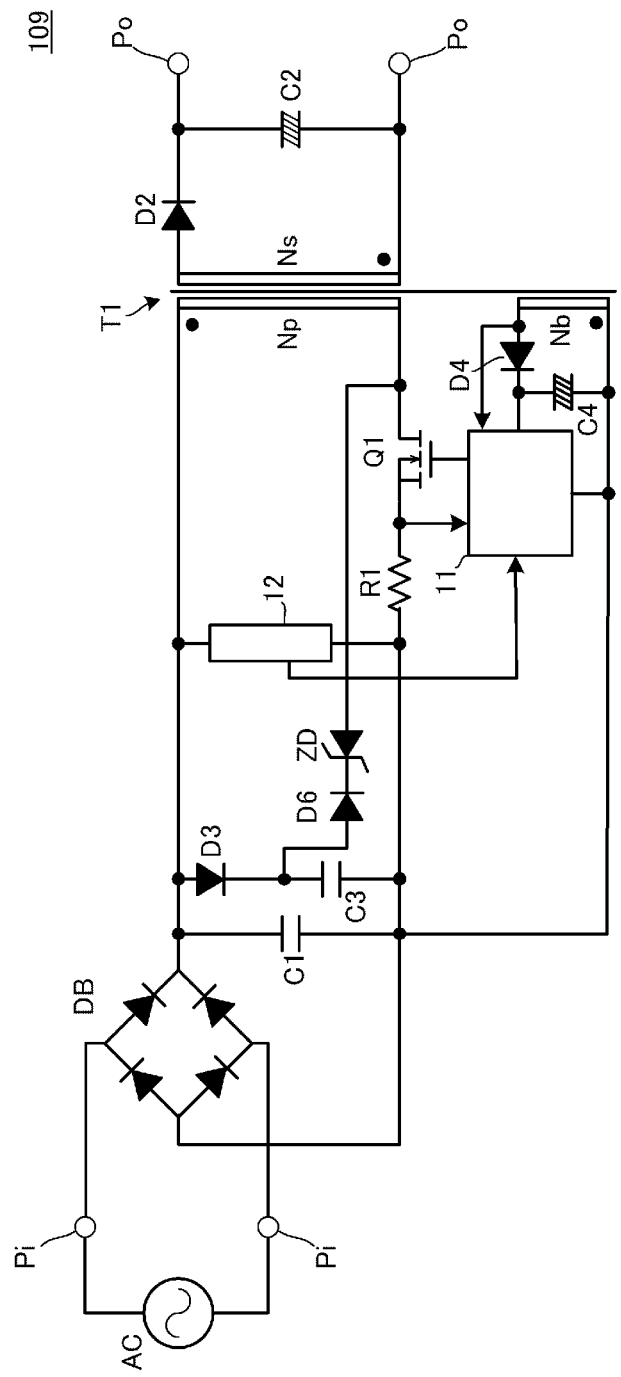
FIG. 10 is a circuit diagram of a PFC converter 109 according to a ninth preferred embodiment of the present invention.

FIG. 10 is a circuit diagram of a PFC converter 109 according to a ninth preferred embodiment of the present invention.

The difference between the PFC converter 109 and the PFC converter 103 according to the third preferred embodiment illustrated in FIG. 4 is that a fourth series circuit including a diode D6 and a Zener diode ZD connected in series to each other is connected in parallel to a third series circuit including the diode D3 and the primary winding Np of the transformer T1 connected in series to each other.

The fourth series circuit forms an electrical charge discharging path for the capacitor C3 in the ON state of the switching element Q1. This discharging is performed only when a rectified voltage output from the diode bridge DB exceeds a Zener breakdown voltage Vzd of the Zener diode ZD. Accordingly, an electrical charge stored in the capacitor C3 at the time of connection to the commercial alternating-current power supply AC can be more effectively prevented from being lost because of discharging.

In the above-described preferred embodiments, an isolated transformer is preferably used. However, a non-isolated transformer may also be used, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A PFC converter comprising:
 a rectifying circuit that rectifies an alternating voltage input from a commercial alternating-current power supply and outputs a rectified voltage;
 a first series circuit that includes a primary winding of a transformer and a first switching element and is connected to an output portion of the rectifying circuit;
 a filter capacitor connected to the output portion of the rectifying circuit;

a rectifying and smoothing circuit that is connected to a secondary winding of the transformer and includes a rectifier diode and a smoothing capacitor; and a second series circuit that includes a second switching element and a capacitor connected in series to each other and is connected in parallel to the filter capacitor, the second switching element conducting in a forward direction when receiving a charging voltage for the filter capacitor; wherein a voltage across the second switching element and the capacitor of the second series circuit is equal or substantially equal to the rectified voltage output by the rectifying circuit;

the capacitor of the second series circuit has a capacitance that is several times larger than a capacitance of the filter capacitor;

in a complete period in which the first switching element is in an ON state, the second switching element is in an OFF state, and an electrical charge stored in the capacitor of the second series circuit is not discharged, the filter capacitor is arranged such that an electrical charge stored in the filter capacitor is discharged by the primary winding of the transformer and the first switching element; and the filter capacitor is connected to the output portion of the rectifying circuit at a location closer to an input side of the PFC converter than a location of the capacitor of the second series circuit.

2. The PFC converter according to claim 1, wherein the second switching element is a diode that conducts in the forward direction when receiving the charging voltage for the filter capacitor.

3. The PFC converter according to claim 1, wherein the second switching element is a transistor that is turned on when receiving the alternating voltage from the commercial alternating-current power supply.

4. The PFC converter according to claim 1, wherein the second series circuit further includes a resistor connected in series to the capacitor of the second series circuit and the second switching element.

5. The PFC converter according to claim 1, further comprising a discharging circuit that is connected in parallel to the capacitor of the second series circuit and is configured to discharge an electrical charge stored in the capacitor of the second series circuit.

6. The PFC converter according to claim 1, further comprising a discharging circuit that is connected in parallel to the second switching element or a third series circuit including the second switching element and the primary winding of the transformer connected in series to each other and is configured to discharge an electrical charge stored in the capacitor of the second series circuit.

7. The PFC converter according to claim 1, wherein the primary winding and the secondary winding of the transformer are isolated from each other.

\* \* \* \* \*